United States Patent
Busby et al.

(10) Patent No.: US 9,702,464 B1
(45) Date of Patent: Jul. 11, 2017

(54) NON-PLANAR STICK GASKETS FOR RECEIPT BETWEEN A BASE AND A WORKPIECE

(71) Applicant: Aviation Devices & Electronic Components, L.L.C., Fort Worth, TX (US)

(72) Inventors: Jeffrey D. Busby, Millsap, TX (US); Michael D. Dry, Fort Worth, TX (US); Douglas J. Smith, Weatherford, TX (US)

(73) Assignee: THE PATENT WELL LLC, Fort Worth, TX (US)

( * ) Notice: Subject to any disclaimer, the term of this patent is extended or adjusted under 35 U.S.C. 154(b) by 0 days.

(21) Appl. No.: 13/644,161

(22) Filed: Oct. 3, 2012

Related U.S. Application Data (60) Provisional application No. 61/542,561, filed on Oct. 3, 2011.

(51) Int. Cl.
*F16J 15/02* (2006.01)
*F16J 15/08* (2006.01)

(52) U.S. Cl.
CPC ........... *F16J 15/02* (2013.01); *F16J 15/0887* (2013.01)

(58) Field of Classification Search
USPC ....... 277/651, 652, 654, 650, 628, 644, 648, 277/906, 935
See application file for complete search history.

(56) References Cited

U.S. PATENT DOCUMENTS 1,851,948 A   3/1932 Summers
1,883,609 A * 10/1932 Dennis .......................... 49/495.1
2,092,393 A   9/1937 Hewitt
3,126,440 A   3/1964 Goodloe
3,473,813 A   10/1969 Meyers
(Continued)

FOREIGN PATENT DOCUMENTS

JP           09109346 A      4/1997
WO           2005030893      4/2005

OTHER PUBLICATIONS

"Conductive Elastomer Gasket Design," Chomerics, www.chomerics.com, pp. 1-9 Jan. 1, 2011.
(Continued)

*Primary Examiner* — Kristina Fulton
*Assistant Examiner* — Eugene G Byrd
(74) *Attorney, Agent, or Firm* — Jackson Walker, LLP (57) ABSTRACT

A gasket for placement between a base of an aircraft structure and the underside of a workpiece, such as an aircraft antenna, is disclosed. The gasket has a cured polyurethane elastomeric gel body with a multiplicity of holes therethrough. The body typically has a flat lower surface and upstanding side walls, but the top surface is non-flat. The top surface may have sloped areas or raised tabular areas or a combination. The gel body may also have a skeleton member, such as a flexible metallic screen or other woven member. When the gasket is placed between the aircraft, base and the workpiece, threaded on fasteners, and the fasteners torqued down, the non-flat upper surface will flow such that, at proper torque setting, it fully coats and fully covers the underside of the workpiece and, typically, makes contact with the screen or skeleton member, which also makes contact with the upper surface of the base.

14 Claims, 9 Drawing Sheets

(56) References Cited

U.S. PATENT DOCUMENTS

| | | | |
|---|---|---|---|
| 3,532,349 A | 10/1970 | Czernik | |
| 3,542,939 A | 11/1970 | Mintz | |
| 3,555,168 A | 1/1971 | Frykberg | |
| 3,681,272 A | 8/1972 | Gloskey | |
| 3,993,833 A | 11/1976 | Esmay | |
| 4,037,009 A | 7/1977 | Severinsen | |
| 4,090,988 A | 5/1978 | Babiec | |
| 4,183,699 A | 1/1980 | Donan | |
| 4,325,280 A | 4/1982 | Hardy | |
| 4,530,443 A | 7/1985 | Gorges | |
| 4,544,169 A | 10/1985 | Cobb | |
| 4,555,119 A * | 11/1985 | Semon | 277/648 |
| 4,572,522 A * | 2/1986 | Smagatz | 277/632 |
| 4,635,949 A | 1/1987 | Lucas | |
| 4,758,004 A * | 7/1988 | Semon | 277/648 |
| 4,835,060 A | 5/1989 | Kosiarski | |
| 4,900,629 A | 2/1990 | Pitolaj | |
| 4,900,877 A * | 2/1990 | Dubrow et al. | 174/351 |
| 4,911,972 A * | 3/1990 | Mercuri | 428/99 |
| RE33,392 E | 10/1990 | Brauer | |
| 5,037,879 A | 8/1991 | Roberts | |
| 5,090,713 A * | 2/1992 | Johnson | 277/648 |
| 5,158,638 A | 10/1992 | Osanami | |
| 5,512,709 A | 4/1996 | Jencks et al. | |
| 5,536,023 A * | 7/1996 | Surbrook et al. | 277/593 |
| 5,607,167 A * | 3/1997 | Franckx | 277/612 |
| 5,702,111 A | 12/1997 | Smith | |
| 5,731,541 A * | 3/1998 | Bernd et al. | 174/387 |
| 5,791,654 A | 8/1998 | Gaines et al. | |
| 5,890,719 A | 4/1999 | Bettencourt | |
| 5,910,524 A | 6/1999 | Kalinoski | |
| 5,929,138 A | 7/1999 | Mercer et al. | |
| 6,056,526 A | 5/2000 | Sato | |
| 6,073,938 A * | 6/2000 | Abe et al. | 277/654 |
| 6,121,545 A | 9/2000 | Peng | |
| 6,346,330 B1 | 2/2002 | Huang et al. | |
| 6,364,976 B2 | 4/2002 | Fletemier | |
| 6,365,812 B1 | 4/2002 | McGill | |
| 6,403,226 B1 | 6/2002 | Biernath et al. | |
| 6,460,859 B1 * | 10/2002 | Hammi et al. | 277/596 |
| 6,530,577 B1 | 3/2003 | Busby | |
| 6,553,664 B1 | 4/2003 | Schenk | |
| 6,598,883 B1 | 7/2003 | Hammi et al. | |
| 6,695,320 B2 | 2/2004 | Busby | |
| 6,719,293 B1 * | 4/2004 | Coles et al. | 277/312 |
| 7,229,516 B2 | 6/2007 | Busby | |
| 7,290,769 B2 | 11/2007 | Piona | |
| 7,309,068 B2 * | 12/2007 | Segawa et al. | 277/596 |
| 7,314,898 B2 | 1/2008 | Downing, Jr. et al. | |
| 7,654,538 B2 | 2/2010 | Oka | |
| 2002/0135137 A1 | 9/2002 | Hammi | |
| 2003/0047885 A1 * | 3/2003 | Busby et al. | 277/650 |
| 2004/0160019 A1 * | 8/2004 | Williams et al. | 277/628 |
| 2005/0023768 A1 | 2/2005 | Adams | |
| 2005/0280214 A1 * | 12/2005 | Richards | 277/608 |
| 2009/0322040 A1 | 12/2009 | Banba et al. | |
| 2010/0258200 A1 | 10/2010 | Walker | |
| 2011/0156353 A1 | 6/2011 | Kabutoya et al. | |
| 2013/0273342 A1 | 10/2013 | Johnson et al. | |
| 2014/0334868 A1 | 11/2014 | Apfel | |

OTHER PUBLICATIONS

"Technical Data Sheet," PN# 1500101130CR, VTT/Shieldex Trading USA, www.shieldextrading.net/product_INDEX.html, 9 pages Jan. 20, 2010.
Tecknit, EMI Shielding Products, Mesh & Elastomer Combination Gaskets, www.tecknit.com/meshelas.html Aug. 31, 2012.
Tecknit, EMI Shielding Products, Oriented Wire Mesh Strip & Gasket Material, www.tecknit.com/orient.html Aug. 31, 2012.
Tecknit, EMI Shielding Products, Conductive Silicone Elastomers, www.tecknit.com/silelast.html Aug. 31, 2012.
Loos & Co., Inc., Knitted Wire Mesh, www.loosco.com/index.php?page=knitted-wire-mesh, 3 pages Dec. 7, 2012.

* cited by examiner

NON-PLANAR STICK GASKETS FOR RECEIPT BETWEEN A BASE AND A WORKPIECE

This provisional application claims the benefit of and priority to U.S. Patent Application Ser. No. 61/542,561, filed Oct. 3, 2011, and incorporates by reference the following U.S. Pat. Nos. 7,229,516; 6,695,320; and 6,530,577; all assigned to Aviation Devices & Electronic Components, LLC.

FIELD OF THE INVENTION

Gaskets, more specifically, gaskets with a non-flat upper surface and a flat, bottom surface.

BACKGROUND OF THE INVENTION

Gaskets provide a mechanical seal that fills the space between two mating surfaces. They may be provided to prevent leakage from or into the pieces which place the gasket under compression. Gaskets may allow for less than perfect mating surfaces on machine parts where they can fill irregularities. Gaskets are commonly produced from cutting sheet materials, such as gasket paper, rubber, silicon, metal, core, felt, neoprene, nitrile rubber, fiberglass or plastic polymer, such as polychloro, trifloro ethylene.

Figure 1:
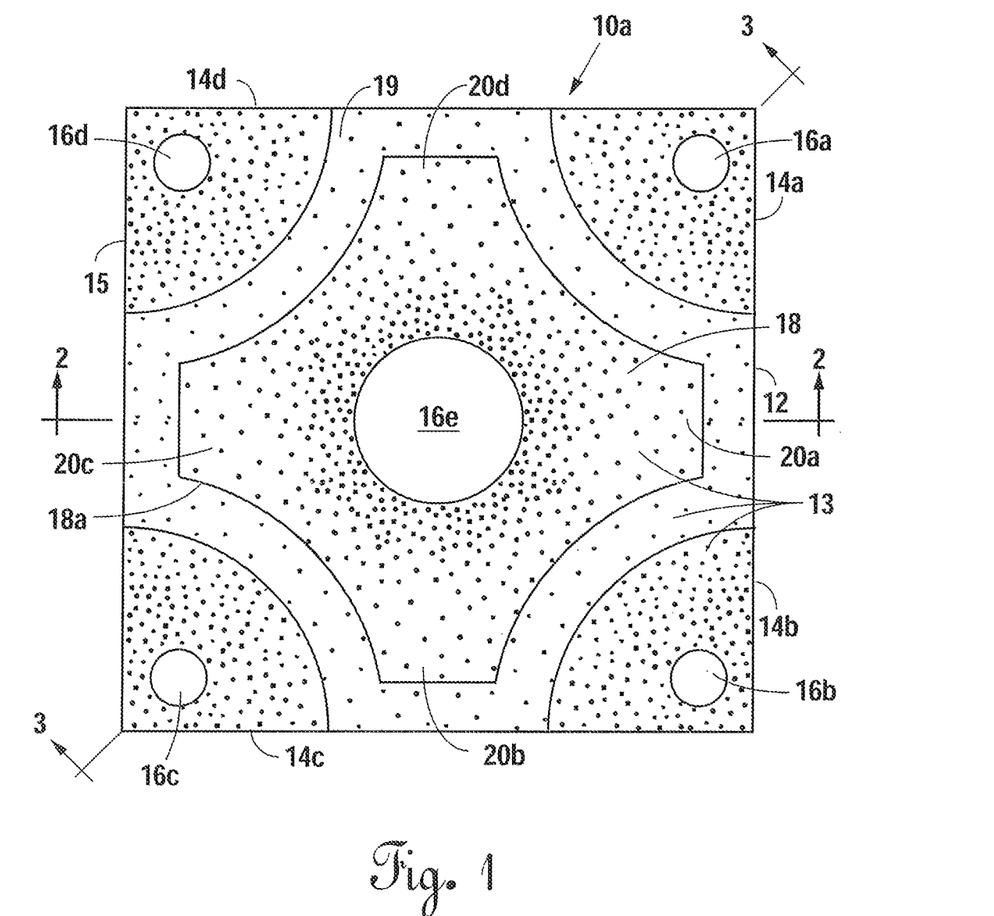
FIG. 1 illustrates a top elevational view of a first embodiment of Applicant's non-tabular gasket.
Figure 1A:
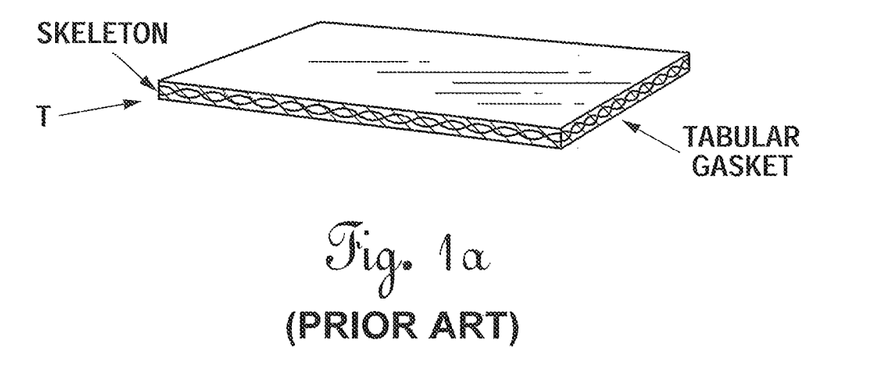
FIG. 1A illustrates a prior art, tabular, sticky polyurethane gasket having a skeleton mesh therein with a thickness T, in perspective view.
Figure 1B:
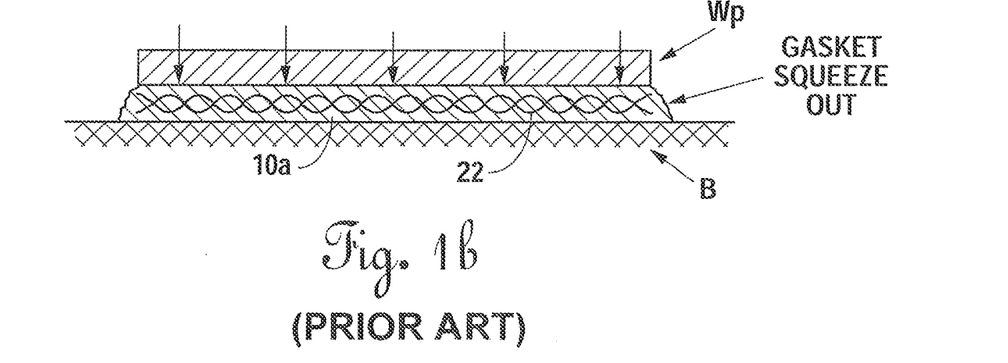
FIG. 1B illustrates a cross-sectional side view of a prior art gasket, such as that set forth in FIG. 1A under compression between a workpiece WP and a base B illustrating the phenomena of squeeze out at the perimeter of the workpiece of the gel material of the tabular gasket.

FIGS. 1A and 1B illustrate a prior art tabular gasket TA. The prior art tabular gasket is seen to have a planar top surface and a planar bottom surface with both the top and bottom surfaces spaced apart a uniform distance and generally parallel. The prior art tabular gasket is intended to be placed between a workpiece WP and a base B. Referring to FIG. 1B, it can be seen that the tabular gasket is placed under compression when the workpiece is fastened to the base, typically by a multiplicity of fasteners torqued down to a proper torque rating.

The workpiece may be an antenna mount for engagement with the exterior of an aircraft whose fuselage comprises a generally flat or slightly curved base B. Applicants' gaskets are typically pre-cured gel, such as a pre-cured polyurethane formulation that retains its soft and tacky physical properties throughout the service temperature of the product. Such a material is disclosed in previous patents issued to Applicants, including U.S. Pat. Nos. 6,530,517; 6,695,320; and 7,229,516, incorporated herein by reference. They are typically pre-cured polyurethane and may contain a skeleton material, such as a metallic or non-metallic mesh material between the top and bottom surfaces.

In FIG. 1B, it is seen that, with the uniform thickness of tabular gasket prior art, compression around fasteners provides primarily a perimeter escape for squeeze out gasket material. The prior art gasket tends to flatten over time and the bolts or fasteners need to be re-torqued. Indeed, there may be a wait as much as 15 minutes for squeeze out to be generated in the prior art gaskets, so as to allow the re-torque of the fasteners to sufficient tightness.

SUMMARY OF THE INVENTION

In combination with a workpiece having a perimeter and a substantially flat or slightly curved underside and a base having a flat or slightly curved upper surface, the workpiece and base adapted to receive fasteners such that the fasteners draw the workplace and base together as the fasteners are tightened, a sticky, elastomeric gel gasket is provided. It has a tabular bottom surface and a non-tabular top surface, the bottom surface for laying on the base, the top surface for contacting the underside of the workpiece. The gasket has a perimeter substantially the same as the perimeter of the workpiece and the gasket is configured to receive the fasteners therethrough. The fasteners of the workpiece are torqued down to a preset final torque setting as the gel of the top surface of the gasket flows and deforms to conform to the flat underside of the workpiece.

The gasket may include a skeleton member. With the gasket between the base and the workpiece, the fasteners of the workpiece are torqued down to a predetermined final torque setting as the gel of the top surface of the gasket flows responsive to contact with the non-tabular top surface of the workpiece, such that the upper surface of the gasket conforms to the flat underside of the workpiece.

DETAILED DESCRIPTION OF THE PREFERRED EMBODIMENT

Figure 2:
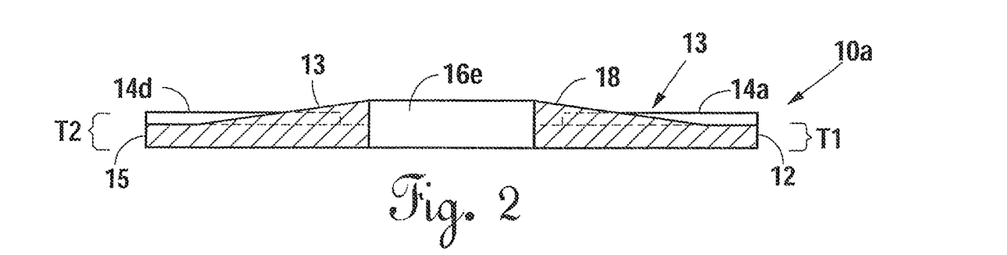
FIG. 2 illustrates a cross-sectional view of the embodiment of FIG. 1 through Section 2.
Figure 2A:
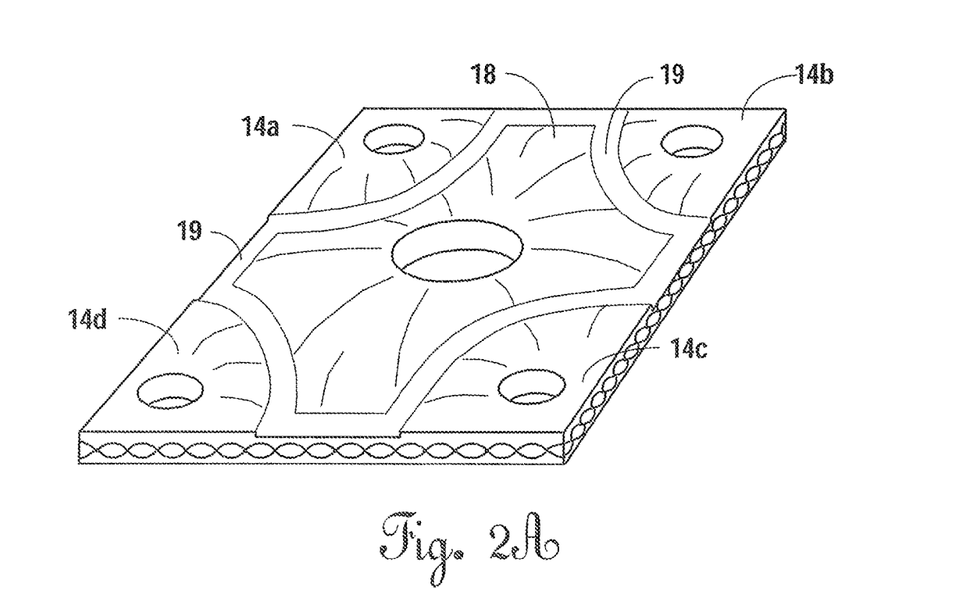
FIG. 2A illustrates a perspective view of the embodiment of FIG. 1.
Figure 3:
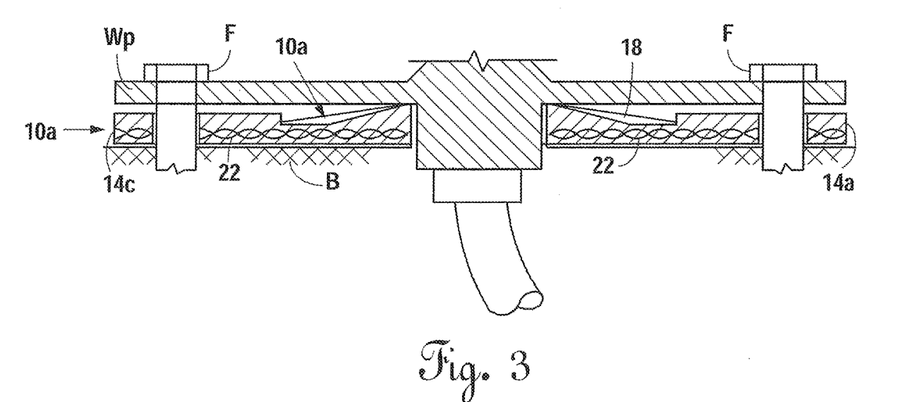
FIG. 3 illustrates a cross-sectional view of the embodiment of FIG. 1 through Section 3, and illustrates the gasket between the upper surface of the base and the lower surface of the workpiece with fasteners generating compression between the workpiece with fasteners F generating compression between the workpiece and the base.
Figure 3A:
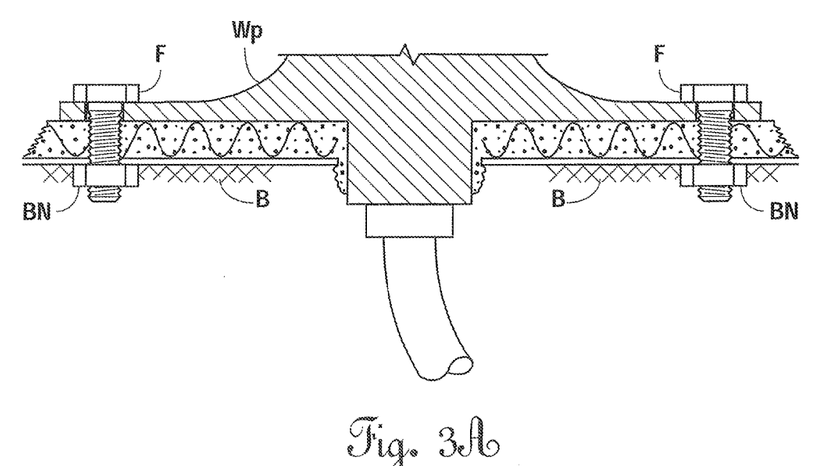
FIG. 3A shows squeeze-out after torquing the fasteners down to the proper torque setting.

Turning now to FIGS. 1, 2, 2A, and 3, an embodiment 10a of a sticky gasket for receipt between a base and a workpiece is shown It is seen with reference to FIGS. 1-3 that a first embodiment 10a of a gasket may be provided that includes a tabular body 12 having a flat bottom wall 12a. However, unlike the prior art, gasket 10a has a non-planar or non-flat top surface 13 which may be best seen in FIGS. 2 and 3. Non-planar typically describes the top surface, the surface that will receive the substantially flat underside of workpiece WP. It is seen with reference to FIG. 3 that as fasteners F are torqued down and workpiece WP moves close to base B, initial contact of the gasket with top surface 13 is made at different points. The thickest portion of gasket 10a will contact the underside of the workpiece first and the thinnest last. The thickest will be under at least initially the most compression and will tend to migrate to areas of lesser compression, that is to say, the thinner portions of the gasket. The thickness T1 of tabular body 12 may be in one preferred range, about 0.047 to 0.050 inches, while the thickness of the highest portion T2 in one preferred range may be up to about 0.055 inches high above the lowest point of the upper surface. There may be intermediate portions also as set forth more fully herein. Another thickness range of T1 may be about 10 mil to about 60 mil with T2 up to about 150 mil.

In embodiment 10a illustrated in FIGS. 1 and 2A, there may be, a general rectangular or square shape to the gasket 10a as best seen in FIG. 1, and there may be a multiplicity of holes in gasket 10a. The shape (perimeter) of the gasket generally conforms to the perimeter of the workpiece. There may be a perimeter 15 defining an outer perimeter of gasket 10a, which is typically sized and shaped to lay adjacent the perimeter of the workpiece. Here, in one embodiment, there are four holes 16a/16b/16c/16d, which are provided for the receipt of fasteners F therethrough (see FIG. 3) and into nuts, such as blind nuts (not shown) or other suitable elements, on the underside of the base. There may be a centrally located antenna hole 16e for the receipt of the antenna to workpiece WP as seen in FIGS. 1 and 3.

Turning now to non-planar top surface 13, it is seen, in one embodiment, to be comprised of a sloped central portion 18, having an outer perimeter 18a, a trough portion 19, and raised generally tabular corner portions 14a/14b/14c/14d.

Turning again to FIGS. 1-3, it is seen that trough portion 19 has borders that lay adjacent both sloped central portion 18 and raised, tabular corner portions 14a/14b/14c/14d. This allows squeeze out of gel during torque down of the workpiece and, with openings to the perimeter will lessen the likelihood of air pockets developing between the underside of the workpiece and the top surface 13 of gasket 10a as the workpiece is torqued down. The non-planar top surface 13 flows to conform and to substantially cover the flat underside of the workpiece. It is seen that raised sloped central portion 18 may have a number of arms, here four arms, 20a/20b/20c/20d, which arms extend towards the perimeter 15 where it lies between fastener holes 16a/161e/16c/16d as best seen in FIG. 1.

The effect of the multiplicity of portions with varying heights is to provide a convoluted or non-planar top surface 13 to the sticky, pliable gasket 10a. Moreover, having a non-planar top surface will generate non-uniform response to compressive forces, for example, compare FIG. 1B to FIG. 3. In FIG. 3, it is seen that as fasteners F are torqued down, the first contact between gasket 10a and the lower tabular flat planar portion of workpiece WP occurs about sloped central portion 18. As the gasket is typically gel-like, flow will tend to be generated away from the high points (under compression) toward points of lower pressure that have not (yet) contacted the underside of the workpiece. It is seen that trough regions or trough portions 19 generally adjacent outer perimeter 18a of sloped central portion 18 receive at least some of the gasket material from central portion 18 flowable under compression as the workpiece is torqued down. FIG. 3 illustrates where non-perimeter areas adjacent raised areas provide for flow or squeeze out, in part, into trough portion 19.

Moreover, with the trough portion 19 adjacent the raised tabular corner portions 14a/14b/14c/14d, it can be seen that there is a non-perimeter area adjacent the raised tabular central portions into which the gel of the non-flat or convoluted top surface 13 can flow. Again, compare FIG. 1B to FIG. 3.

Figure 4:
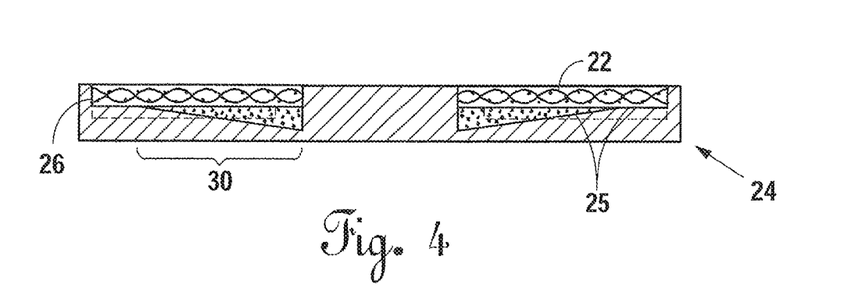
FIG. 4 illustrates a device for and a method of manufacturing the gasket of FIG. 1, showing use of a mold, the cross-section of the mold through Section 2 of FIG. 1.
Figure 5:
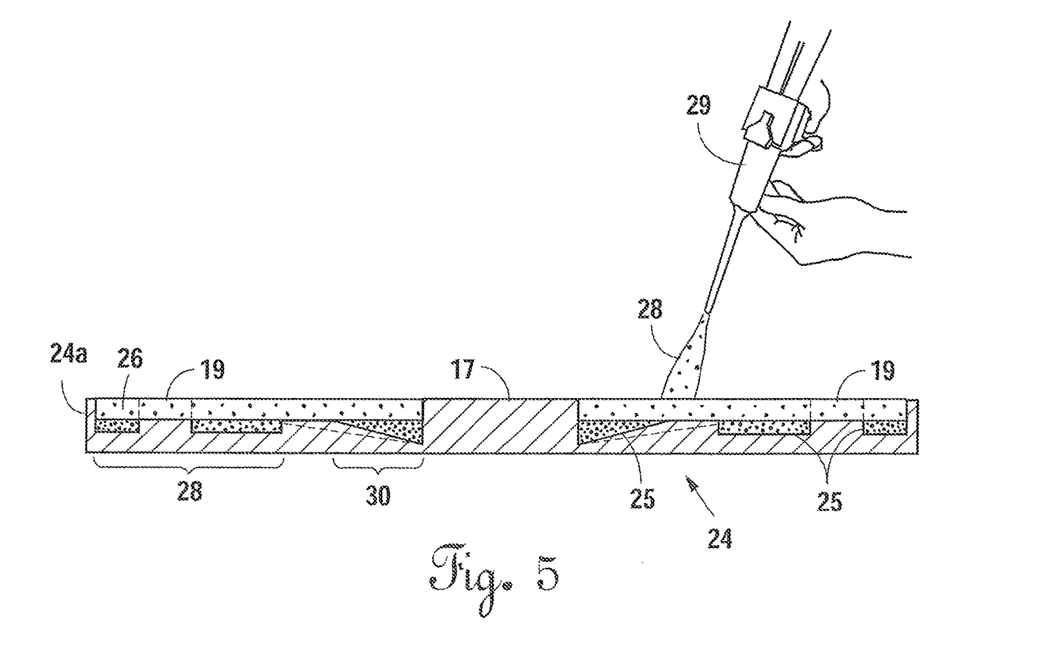
FIG. 5 illustrates a device for and a method of manufacturing the gasket of FIG. 1, showing use of a mold, the cross-section of the mold through Section 3 of FIG. 1.

Turning now to FIGS. 4 and 5, a method of manufacturing gasket 10a is illustrated. A mold 24 is provided for shaping the gasket having a planar bottom surface and a non-planar top surface. Gel 28 may be poured or injected with an applicator 29, the gel typically having a two-part mix of polyurethane for curing in the mold. Mold 24 is seen to have a bottom surface 25 that is configured to conform as negative to positive (mold to die), with the top surface 13 of gasket 10a. The polyurethane gel 28 is injected and may comprise a two-part mix which will cure over a period of about 90 minutes. The mold is dimensioned to comprise a volume 26 generally tabular, which will correspond to tabular body 12, as well as volume 28 that will correspond to raised corners 16a/16b/16c/16d. Finally, volume 30 is seen to conform to sloped central portion 18. Projections 17 (antenna hole) and 19 (four fastener holes) provide for holes 16a-e.

Injection may be accomplished after skeleton or mesh 22 is placed in the mold 24 followed by injection over the depressed volumes 28/30 as seen in FIG. 5. Alternately, the mesh is placed after the low areas are filled. In either case, injection of the gel mix 28 is typically provided first over the lower areas (corresponding to the raised portions of non-tabular top surface 13) and injection continues until all of the voids are complete and filled. Typically, the gel may be self-leveling and will flatten out across the top, giving a flat area corresponding to a flat bottom wall or surface 12a of gasket 10a. In the alternative, a flat or straight edge (not shown) may be used to clean off or level the pre-cured mix that is above the side walls 24a of the mold, so as to create a substantially flat bottom wall.

Depressed volumes 28/30 corresponding to elements 18 and 14a/14b/14c/14d may be filled with a gel having the same or different characteristics than the gel comprising volume 26, which corresponds to tabular body 12. The high areas of the gasket body may be harder or softer than those below the high portions, in one embodiment.

Typical dimensions for thickness T1 of body 12 are about 0.047 to 0.050" in one preferred range. Typical total thicknesses of tabular portions 14a/14b/14c/14d are typically in the range of about 0.050 to 0.055 inches in one preferred range. Typical thicknesses of the sloped central portion are about 0.047 to 0.055 inches in one preferred range.

Figure 6:
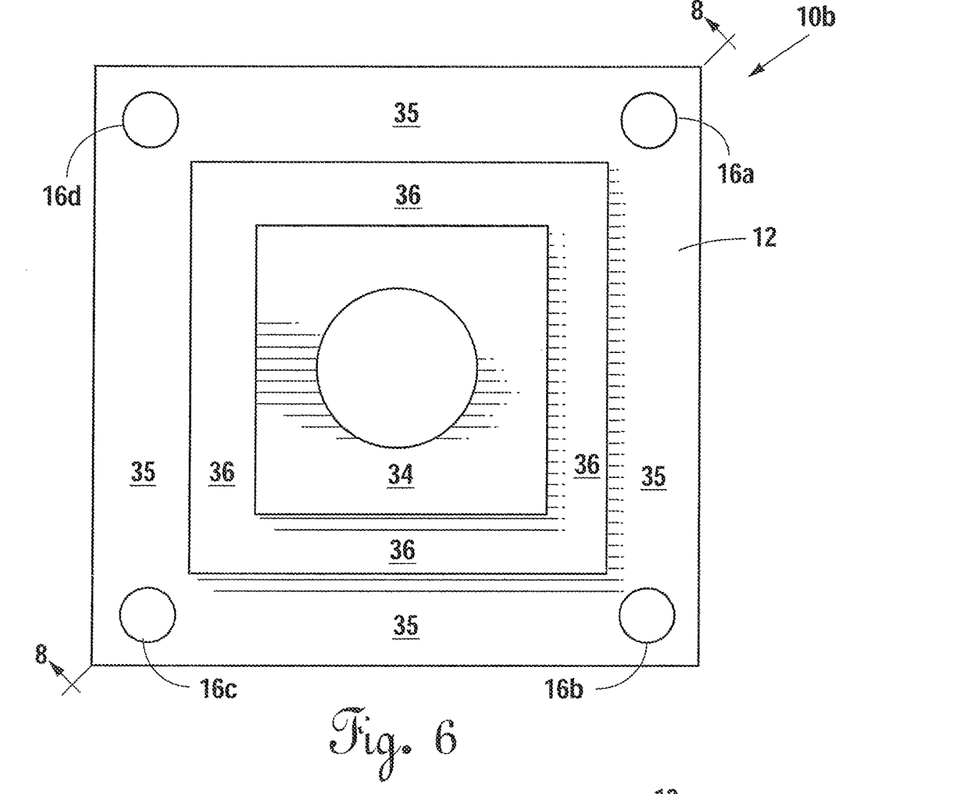
FIG. 6 illustrates a top elevational view of a second embodiment of Applicant's non-tabular gasket.

FIG. 6 illustrates a second embodiment 10b of Applicants' gasket. As in the embodiment set forth in gasket 10a, the embodiment in 10b has a planar or flat bottom surface 12a and a non-tabular top surface 13. However, the shape of the top surface 13 in gasket 10b is different than gasket 10a. The embodiment of gasket 10b includes a generally tabular body 12 similar to the previous embodiment, that is, flat bottom, generally upright side walls, fastener holes. However, central raised portion 34 is flat or tabular (does not slope) and sits above an intermediate flat or tabular (non-sloped) raised portion 36. Intermediate, tabular raised portion is, in turn, adjacent a perimeter area 35 that borders the perimeter 15 of the gasket 10. Skeleton member 22 may be provided and will be typically located between the surfaces defining tabular body 12, and may be used with any embodiment disclosed herein.

Figure 14:
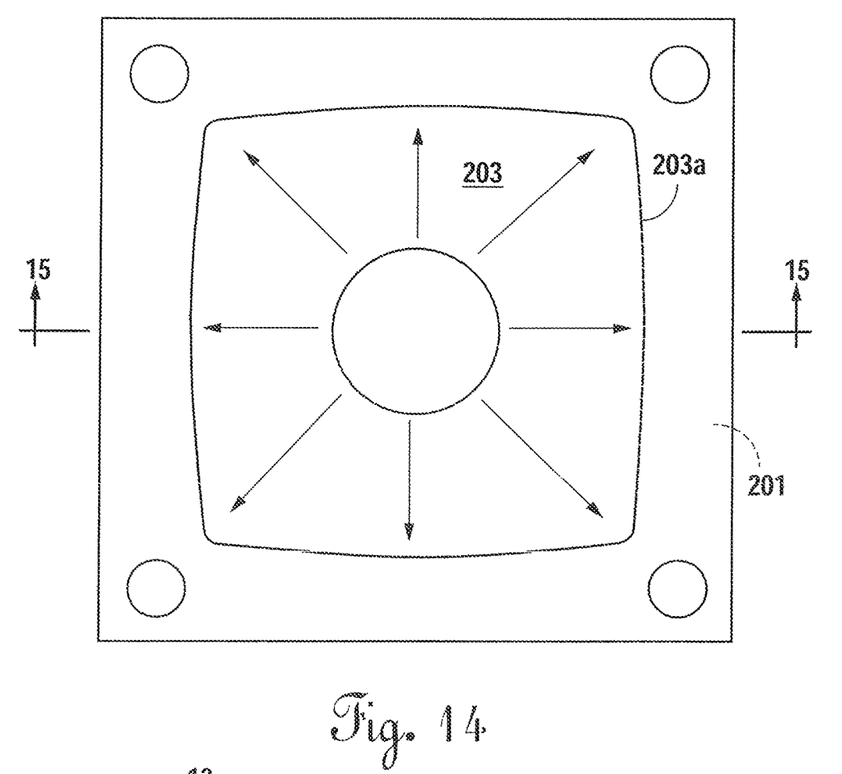
FIG. 14 illustrates a top elevational view of a fourth embodiment.

If one pictures gasket 10b in place of gasket 10a in FIG. 3, the arrows shown in FIG. 14 illustrate the general movement of gel comprising top surface 34 under compression when first contacted by the lower surface of the workpiece as the fasteners are torqued down. It will be seen that the resistance to the torque will be, in part, a function of the mass under compressive forces flowing generally as illustrated in FIG. 14 (high pressure to lower pressure). As compression continues and flow continues, the non-tabular upper surface will start to conform with the underside of the workpiece until under compression the convoluted (non-flat) top surface becomes generally flat substantially covering the underside of the workpiece, as the fasteners reach their proper torque settings. This will typically occur about when the mesh contacts the bottom of the workpiece and the top of the base, or when the post-torque thickness is between about 10 to 15 mil, which may contact the skeleton or compress and deform the skeleton under compression between the workpiece and the base.

Figure 7:
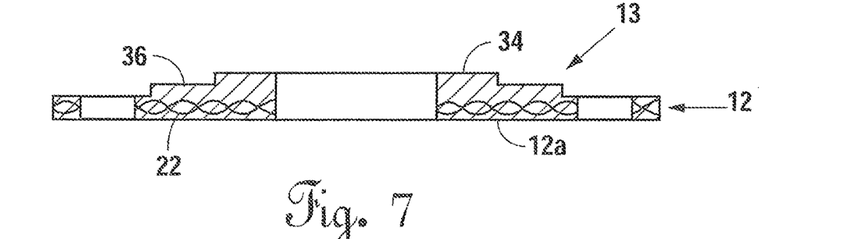
FIG. 7 illustrates a cross-sectional view of the embodiment of FIG. 6 through Section 8.
Figure 8:
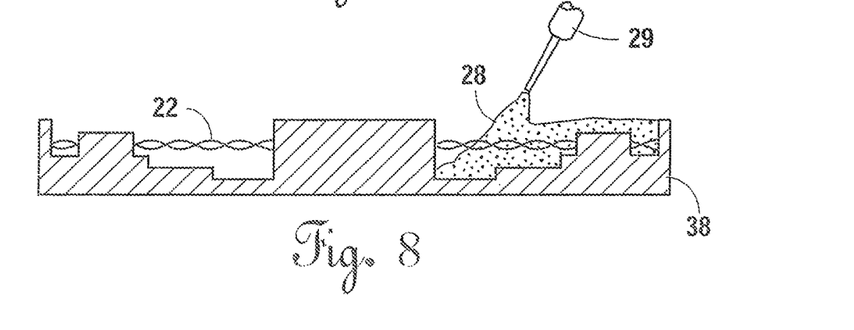
FIG. 8 illustrates a device for use and a method of manufacturing the embodiment illustrated in FIG. 6.

FIG. 7 illustrates a cross-section of gasket 10b through section 7 as illustrated in FIG. 6. Here, the generally homogenous nature of the mix comprising the gel can be seen as can the location of the mesh 22. In FIG. 8, a mold is provided that will produce the embodiment 10b. FIG. 8 shows a partial filling of mix 28 into mold 38. Mold 38 is configured to have a lower surface to conform to top surface 13 of gasket 10b.

Figure 9:
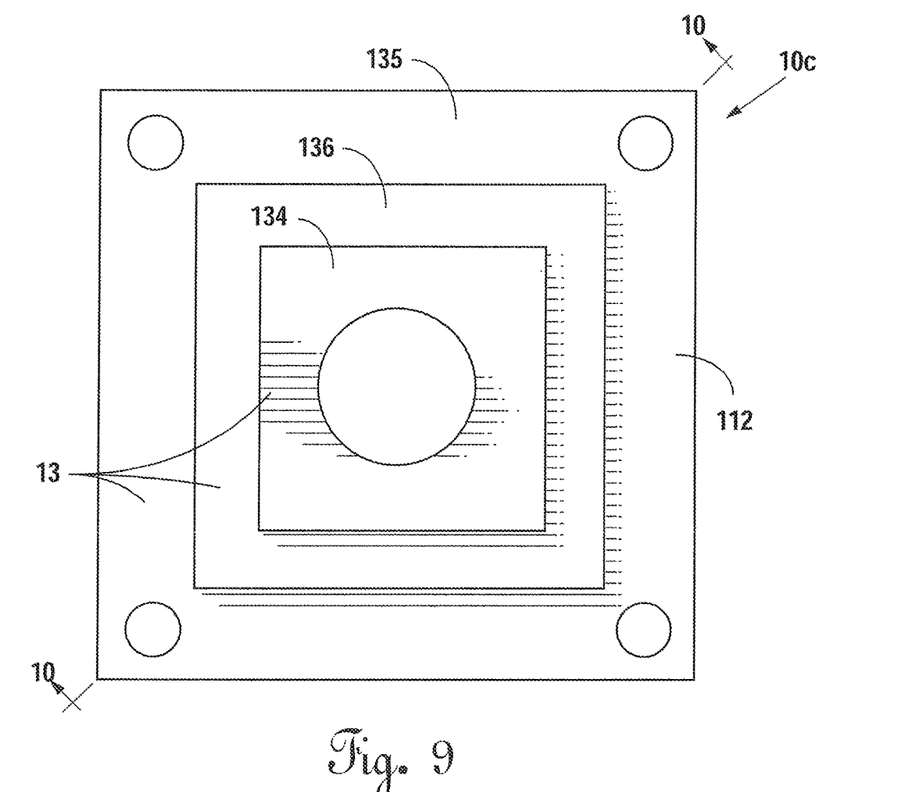
FIG. 9 illustrates a top elevational view of a third embodiment of Applicants' non-tabular gasket.

While FIG. 9 illustrates a multi-ply embodiment of the gasket illustrated in FIG. 6, Applicants note that the embodiment of 10a may also be comprised of a multi-ply construction. That is to say, raised central portion 18 may be poured separately in a properly configured mold and allowed to cure. Likewise, tabular body 12 may be poured separately in another properly configured mold, with the mesh material embedded therein. Raised corner portions 14a/14b/14c/14d may be likewise prepared in separate molds. Holes 16a/16b/16c/16d/16e are typically part of this mold, but may be die-cut later. When the several plies are joined together (the gel is typically sticky, as set forth in the patents incorporated by reference), they may be mounted on a holding device configured with projections through holes A-D and top and bottom surfaces.

FIG. 7 shows section 7 of FIG. 6, and FIG. 8 shows cross-section of section 7, but of mold 38. There is typically an injection of the two-part polyurethane mix 28 from applicator 29 for curing in mold 38 and, again, there may be a single pouring or multiple pourings comprising polyurethane with different characteristics, such as softer or harder polyurethane. Moreover, it is seen that skeleton member 22 may be laid across support portions 37, which correspond to perimeter portion 35.

Figure 10:
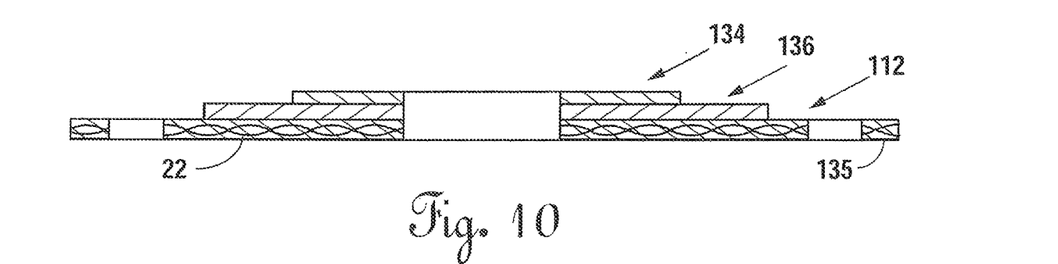
FIG. 10 illustrates a cutaway sectional view of the embodiment of FIG. 9 showing the three ply nature to the embodiment wherein additional tabular or non-tabular plies may be provided to a base ply.

FIG. 9 illustrates a third embodiment 10c that in a top view appears to and does, in fact, have the same general shape of top surface 13 and gasket 10b as seen in FIG. 6. It includes a perimeter portion 135 of body 112, a raised central portion 134, and an intermediate portion 136. The reason these are so designated can be seen with respect to FIG. 10, wherein it is seen that each of the three elements 112, 135, and 136 may be formed and cured separately and then stacked together to form gasket 10c with a non-flat top surface 13. As can be seen in FIG. 10, as in the previous embodiments, skeleton member 22 is typically confined to tabular body 112. Again, when two or more, here three plies, elements 112, 136, and 134, are made and cured separately (each in a separate mold) and then placed one on top of the other to form composite multi-ply gasket 10c, the physical characteristics of the gel of each ply may vary, as in hardness, for example, from one ply to the next or they may be the same.

Figure 11:
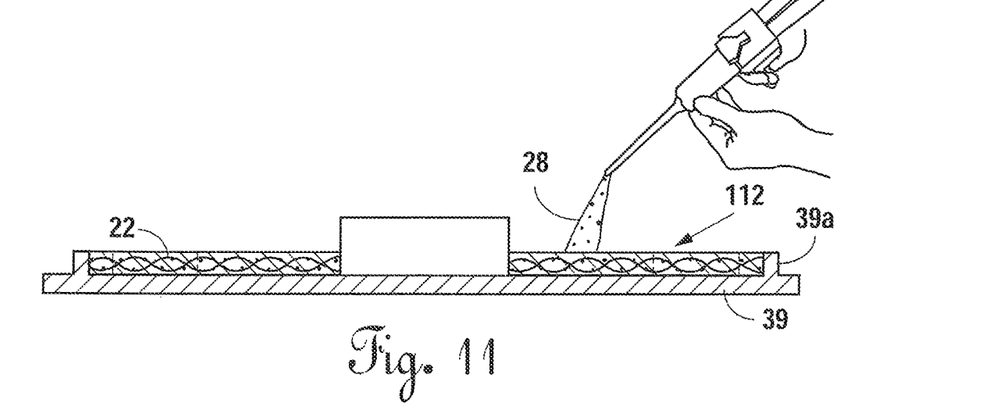
FIGS. 11, 12, and 13 illustrate devices for and a method of manufacturing the third embodiment as illustrated in FIG. 9.
Figure 12:
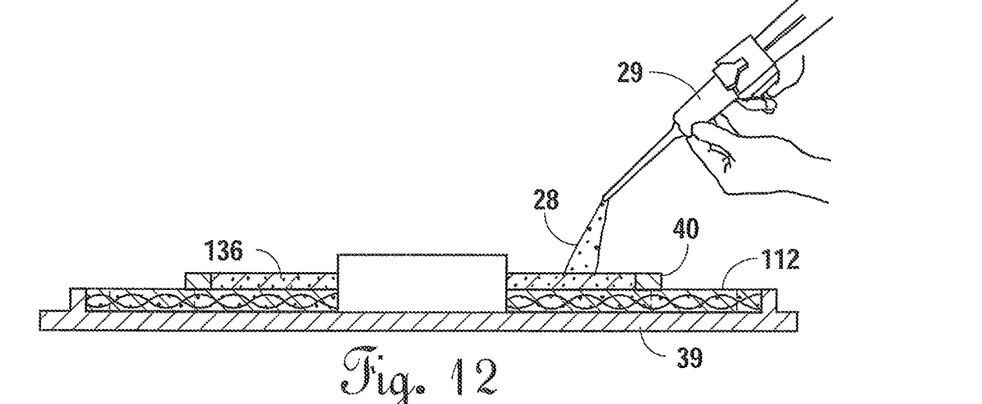
Figure 13:
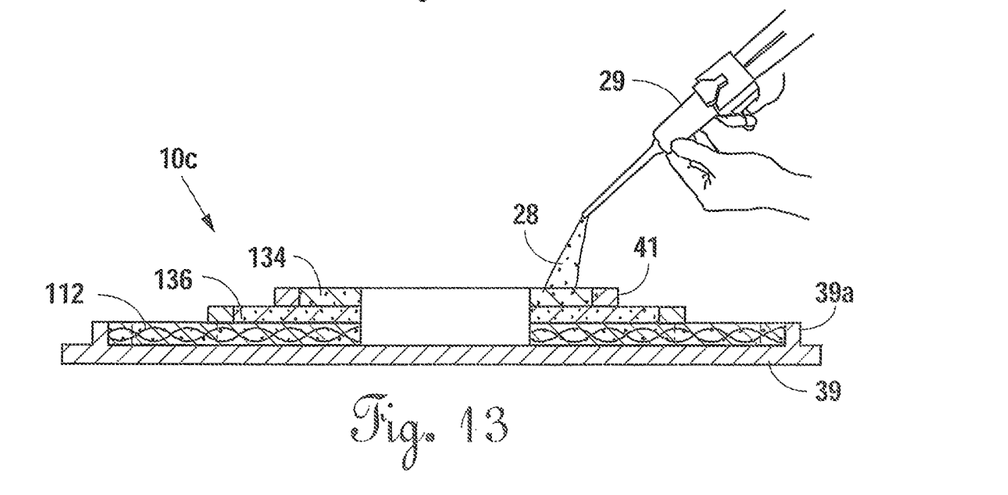

In FIGS. 11, 12, and 13, a method of manufacturing in embodiment 10c is illustrated. Here, a first mold 39 is provided and configured with side walls 39a to define the perimeter of base 112, that is to receive mesh 22 and to receive mix 28. The thickness of base 112 is at or slightly more than the thickness of mesh 22. When base 112 cures, then second mold 40 can be placed on the top surface thereof and mix 28 poured thereinto as seen in FIG. 12. When that mix cures, a mix which may have different properties, here still designated 28, can be used for third mold 41. Third mold 41 lays on the cured top surface of portion 136 as seen in FIG. 13, and a final injection step is provided. When the gel forming raised portion 134 is cured, molds 40/41 can be removed and then the gasket 10c can be removed from mold 39 for use as set forth herein.

Figure 15:
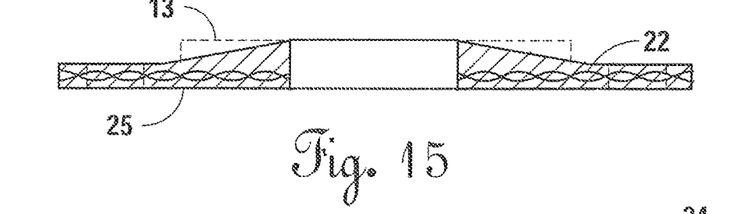
FIG. 15 illustrates a cross-sectional view of a fourth embodiment.

FIGS. 14 and 15 illustrate a fourth embodiment 10d of Applicants' gasket. Here, top surface 13 comprises a perimeter portion 201 and an inner raised portion 203. It is seen in FIG. 14 that inner raised portion may have an outer border 203a, which has an outline or shape similar to that of the perimeter of the gasket itself. That is to say, there is about a constant distance between 203a and the perimeter. Inner raised portion 203 may be sloped or tabular. The sloped version is illustrated as best seen in FIG. 15 with tubular in dashed lines.

As with the earlier embodiments, a flat bottom surface 25 is provided and, typically, a skeleton member 22. It can be seen in all the embodiments that the thickness of the skeleton member 22 may be close to the thickness of the thinnest part of the tabular gasket, typically about 10 mil to 50 mil. While holes are shown, such as holes for fasteners or gaskets, there may be applications where the holes may be eliminated, at least some of the holes. In FIG. 14, the arrows illustrate the general direction of flow of the gel comprising the inner raised portion 203 when it is initially met with compression between the workpiece and the base.

Figure 16:
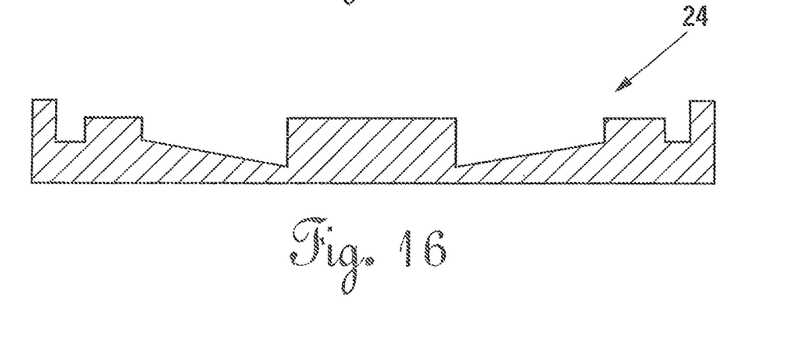
FIG. 16 illustrates a mold to make the embodiment of FIG. 14.

FIG. 16 illustrates a mold 24 that may be used in a manner set forth with the molds represented by the earlier figures for manufacturing a gasket as that set forth in FIGS. 14 and 15.

When the term "tabular" is used, it refers to the very long length and width dimension compared to thickness. A preferred tabular slope has the smaller of length or width at least about ten times the maximum thickness. The radius of curvature of the underside of the workpiece and the outer surface of the base may be in the range of about 3 feet to about 20 feet.

In a preferred environment, any of Applicant's disclosed herein are used between a workpiece comprising an aircraft antenna. The gasket is placed between the Wp and B on, typically, four fasteners. The fasteners are torqued down to between 20 and 60 inch pounds, without a wait period of greater than a few minutes and a second torquing.

The hardness of the body may be between about 40 and 150 cone penetration. The gel may be the polyurethane gel disclosed in the '576, '320, and '577 patents or any gel, preferably non-silicon. The skeletons may be any of those in the foregoing patents or any suitable metallic or non-metallic, woven or non-woven, flexible skeleton.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A gasket for placement between a generally flat or slightly curved upper surface of a static base of an aircraft structure and a generally flat or slightly curved underside of a removable workpiece, the upper surface of the base and the underside of the workpiece being generally conforming surfaces, the workpiece for removable attachment to the base of the aircraft structure through a multiplicity of fasteners, wherein the underside of the workpiece and the upper surface of the base are generally conforming in their planes, the gasket comprising:
    a cured voidless elastomeric gel body, the body in the uncompressed state with a multiplicity of fastener holes therethrough the body being generally tabular with an all flat, non-configured lower surface and an upper surface and side walls defining a perimeter, the perimeter of the body generally conforming to the perimeter of the workpiece, the body having a thickness of between about 10 mil and 50 mil, as measured between the flat lower surface and a highest point of the upper surface, the upper surface configured with one or more high portions and one or more low portions, the low portions being areas of minimum thickness, the gel of the gel body flowable between the high portions and the low portions responsive to fasteners urging the workpiece towards the base as they are torqued to a preselected torque value, the upper surface of the voidless body capable of conforming to the shape of the underside of the workpiece and remaining free of voids in a compressed state; and
    a skeleton member disposed between the upper surface and the lower surface.

2. The gasket of claim 1, wherein at least one high portion is substantially flat.

3. The gasket of claim 1, wherein at least one high portion is sloped.

4. The gasket of claim 1, wherein at least one high portion is sloped and at least a second high portion is flat.

5. The gasket of claim 1, wherein the perimeter includes at least one high portion and at least one low portion.

6. The gasket of claim 1, wherein the fastener holes are adjacent high portions.

7. The gasket of claim 1, wherein the body has a hardness of between about 40 and 150 cone penetration.

8. A gasket for placement between a generally flat or slightly curved upper surface of a base of an aircraft structure and a generally flat or slightly curved underside of a workpiece, the upper surface of the base and the underside of the workpiece being generally conforming surfaces, the workpiece for removable attachment to the base of the aircraft structure through a multiplicity of fasteners which engage, with blind threaded elements, the underside of a base, wherein the underside of the workpiece and the upper surface of the base are generally conforming in their planes, the gasket comprising:
    a cured voidless elastomeric gel body, the body with a multiplicity of fastener holes therethrough the body being generally tabular with an all flat, non-configured lower surface and a non-flat upper surface and side walls defining a perimeter, as measured between the flat lower surface and a highest point of the upper non-flat surface, the upper surface configured with one or more high portions and one or more low portions, the low portions being areas of minimum thickness, the gel flowable between the high portions and the low portions responsive to fasteners urging the workpiece towards the base as they are torqued to a preselected torque value, the upper surface of the voidless body capable of conforming to the shape of the underside of the workpiece and remaining free of voids in a compressed state; and
    further including a flexible skeleton member disposed between the upper surface and the lower surface of the body.

9. The gasket of claim 8, wherein the flexible skeleton member is a woven material.

10. The gasket of claim 8, wherein the skeleton member is metallic.

11. The gasket of claim 8, wherein the workpiece is an aircraft antenna and the base is the outer skin of the fuselage.

12. A gasket for placement between a generally flat or slightly curved upper surface of a static base of an aircraft structure and a generally flat or slightly curved underside of a removable workpiece, the upper surface of the base and the underside of the workpiece being generally conforming surfaces, the workpiece for removable attachment to the base of the aircraft structure through a multiplicity of fasteners, wherein the underside of the workpiece and the upper surface of the base are generally conforming in their planes, the gasket comprising:
    a cured voidless elastomeric gel body, the body with a multiplicity of fastener holes therethrough the body being generally tabular with an all flat, non-configured lower surface and an upper surface and side walls defining a perimeter, the perimeter of the body generally conforming to the perimeter of the workpiece, the body having a thickness of between about 10 mil and 50 mil, as measured between the flat lower surface and a highest point of the upper surface, the upper surface configured in an uncompressed condition with one or more high portions and one or more low portions, the low portions being areas of minimum thickness, the gel of the gel body flowable between the high portions and the low portions responsive to fasteners urging the workpiece towards the base as they are torqued to a preselected torque value, the upper surface of the voidless body capable of conforming to the shape of the underside of the workpiece and remaining free of voids in a compressed state;
    wherein in an uncompressed condition at least one high portion is substantially flat;
    wherein in an uncompressed condition at least one high portion is sloped;
    wherein in an uncompressed condition the perimeter includes at least one high portion and at least one low portion; and
    wherein in an uncompressed condition the fastener holes are adjacent high portions.

13. The gasket of claim 12, wherein in the compressed condition the gel body substantially releasably seals a space between the underside of the workpiece and the upper surface of the base.

14. The gasket of claim 13, wherein the elastomeric gel body comprises a cured polyurethane gel.

\* \* \* \* \*